United States Patent

Matuzawa et al.

[11] Patent Number: 5,314,229
[45] Date of Patent: May 24, 1994

[54] FRONT BODY STRUCTURE

[75] Inventors: Tomoki Matuzawa, Susono; Seiji Yokota, Nagoya; Katsuhiko Emori, Okazaki; Junichi Harada, Susono, all of Japan

[73] Assignee: Toyota Jidosha Kabushiki Kaisha, Toyota City, Japan

[21] Appl. No.: 977,013

[22] Filed: Nov. 16, 1992

[30] Foreign Application Priority Data

Nov. 19, 1991 [JP] Japan .................................. 3-303575

[51] Int. Cl.5 .............................................. B60R 27/00
[52] U.S. Cl. .................................... 296/189; 293/133; 280/735; 188/377
[58] Field of Search ................. 296/189, 188; 293/133; 188/377; 280/735

[56] References Cited

U.S. PATENT DOCUMENTS

| 391,295 | 10/1975 | Eggert, Jr. . | |
|---|---|---|---|
| 3,792,874 | 2/1974 | Ayres et al. | 280/735 |
| 3,819,224 | 6/1974 | Casey et al. | 296/189 |
| 3,861,488 | 1/1975 | Hamada et al. | 280/735 X |
| 3,998,485 | 12/1976 | Putter et al. | 293/133 |
| 4,023,652 | 5/1977 | Torke | 293/133 X |
| 4,152,012 | 5/1979 | Reidelbach et al. | 293/133 X |
| 4,399,887 | 8/1983 | Okada | 280/735 X |
| 5,100,189 | 3/1992 | Futamata et al. | 296/189 X |

FOREIGN PATENT DOCUMENTS

| 2509351 | 9/1975 | Fed. Rep. of Germany . | |
|---|---|---|---|
| 2137517 | 6/1979 | Fed. Rep. of Germany | 296/189 |
| 3711692 | 10/1988 | Fed. Rep. of Germany . | |
| 2273982 | 1/1976 | France . | |
| 2-10159 | 1/1990 | Japan . | |
| 2-60055 | 5/1990 | Japan . | |
| 2175452 | 7/1990 | Japan . | |

OTHER PUBLICATIONS

Stephen Goch et al, "Inflatable Restraint System Design Consideration", Society of Automotive Engineers, Inc. (1991), pp. 23-43.

Primary Examiner—David M. Mitchell
Assistant Examiner—Gary C. Hoge
Attorney, Agent, or Firm—Cushman, Darby & Cushman

[57] ABSTRACT

A front body section of a vehicle which is provided with a front-side member and a crush box. The crush box includes a front section and a rear section, which are disposed in front of the front-side member so as to be axially aligned and connected thereto. An upper plate, a lower plate, an outer plate, and an inner plate, all of which form the front section, are prepared so as to provide a lower level of total plastic characteristic, when under load, than those plate members which form the rear section. The crush box thereby exhibits a total plastic characteristic, when under load, in two stages.

17 Claims, 13 Drawing Sheets

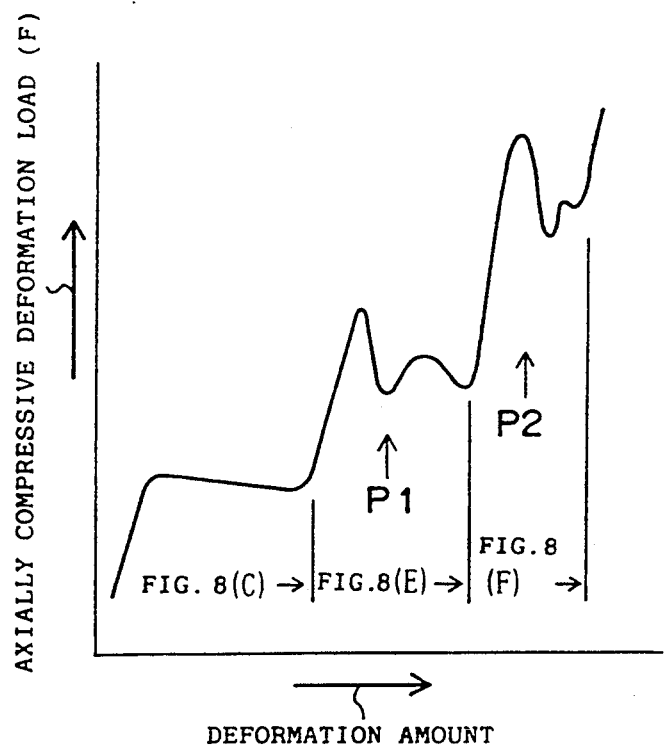

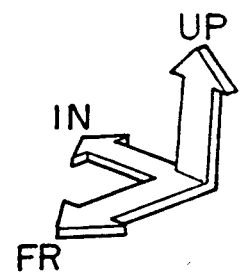
FIG. 10A
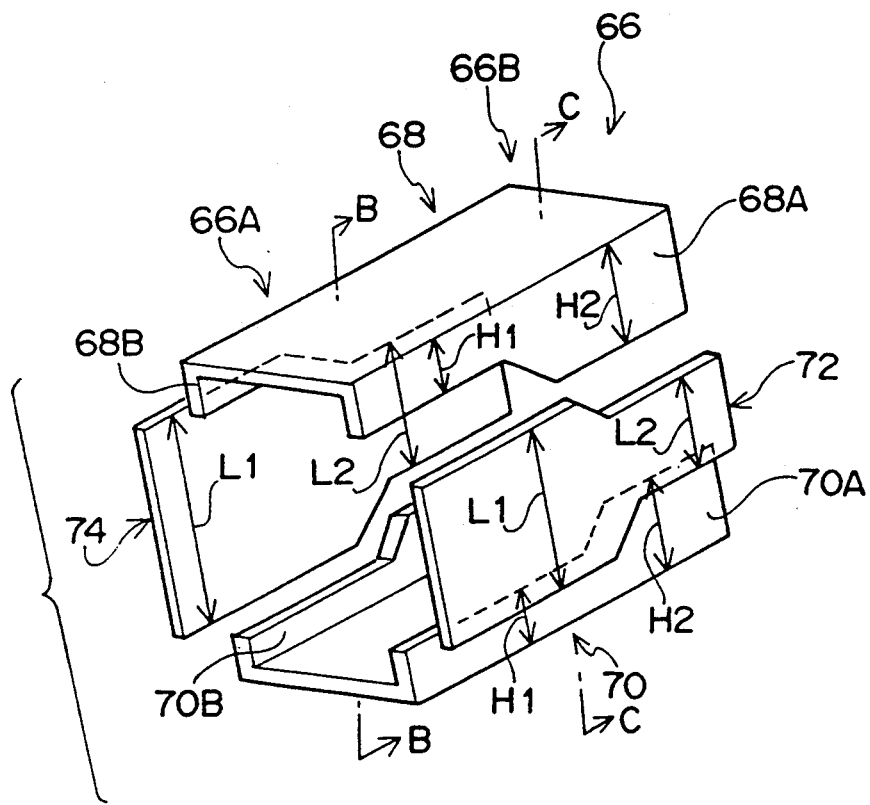
FIG. 10B  FIG. 10C
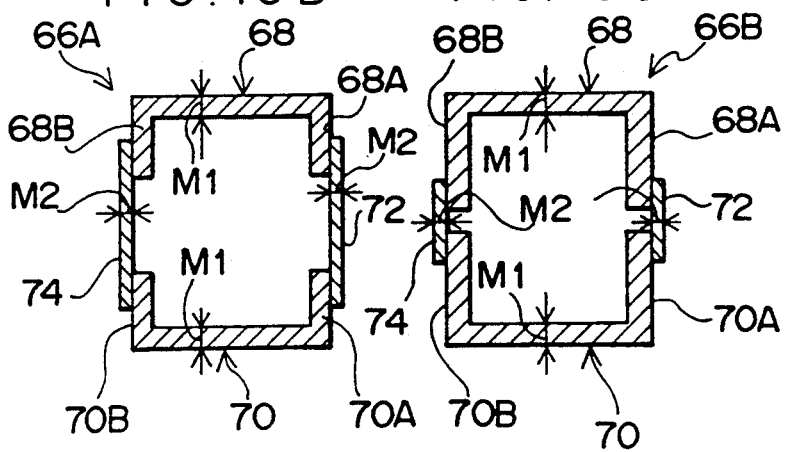

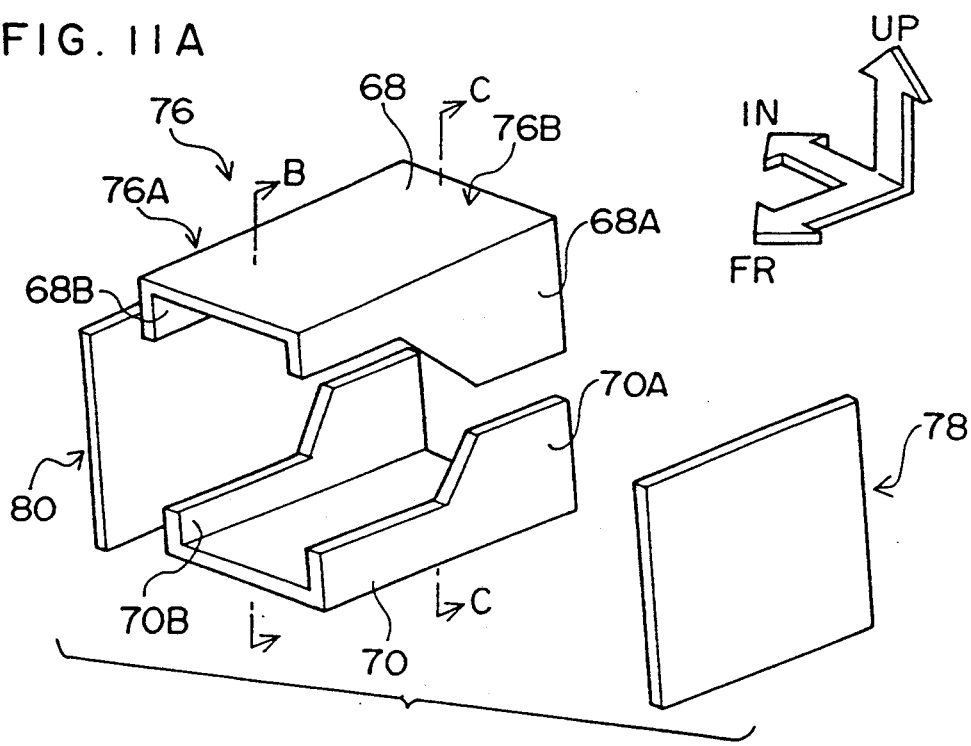
FIG. IIA
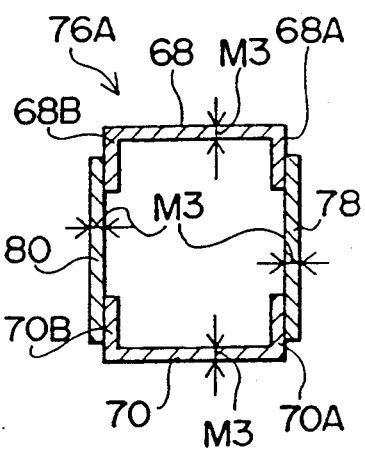
FIG. IIB
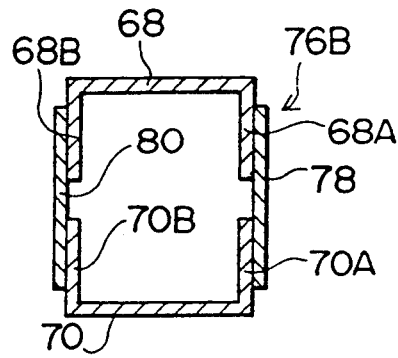
FIG. IIC
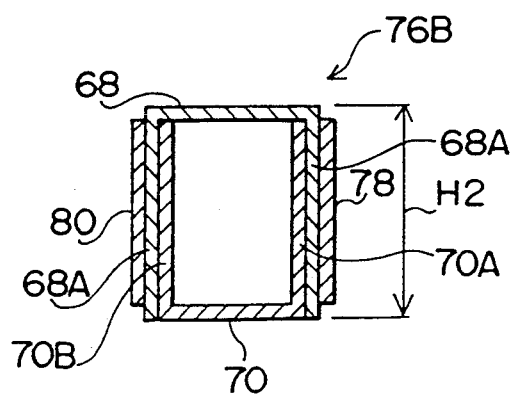
FIG. IID

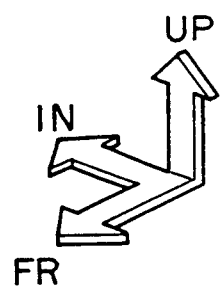
FIG. 12A
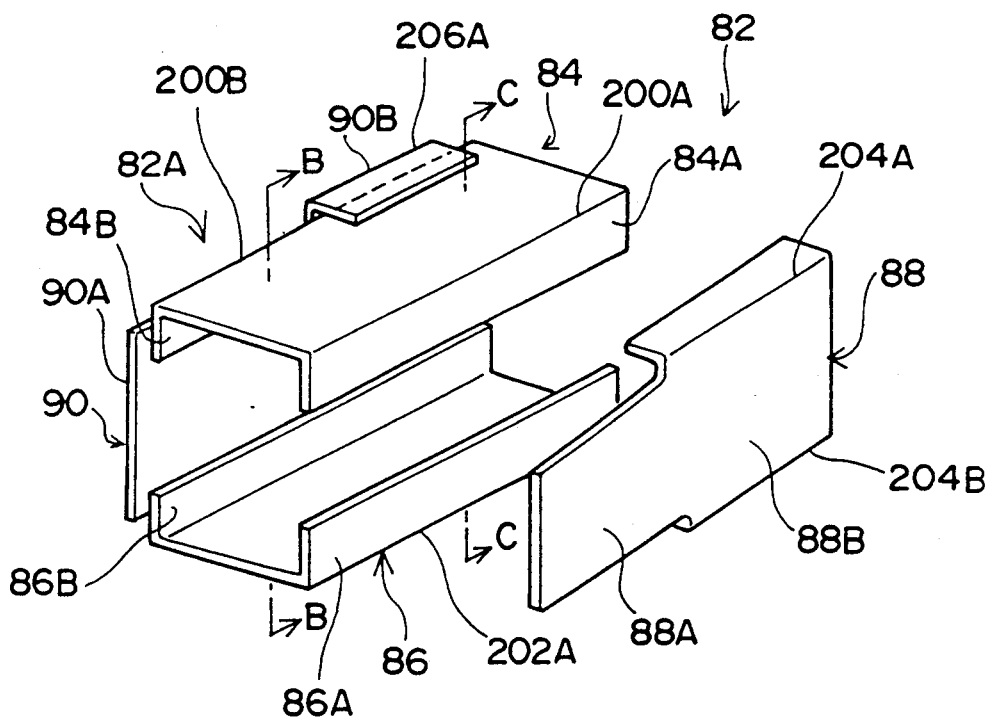
FIG. 12B    FIG. 12C
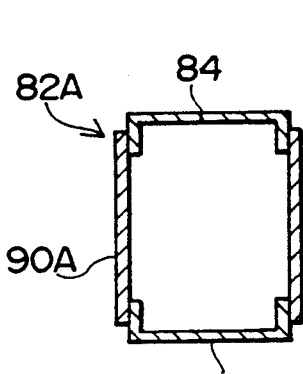
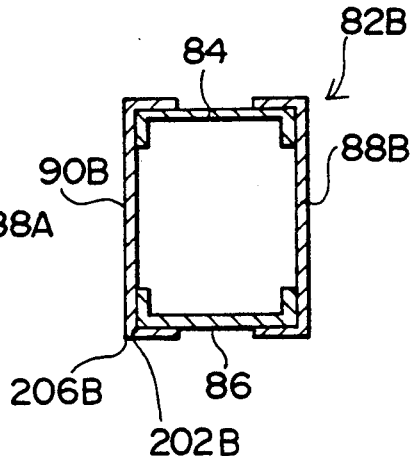

FRONT BODY STRUCTURE

BACKGROUND OF THE INVENTION

1. Field of the Invention

The present invention relates to a front body structure for use in a vehicle, and more particularly, to a front body structure for use in a vehicle having an acceleration sensor.

2. Background Information

It is known that Japanese Utility Model Application Laid-Open No. 2-6055 discloses one example of a conventional front body structure for use in a vehicle which includes an acceleration sensor.

FIG. 13 illustrates a front body structure, in which a front frame is provided at a front end portion of a vehicle body 110 in a transverse direction thereof, with a plurality of acceleration sensors 112 being disposed on the front frame. When sudden acceleration is imparted to the vehicle body 110, the acceleration sensors 112 activate an air bag device which is provided in an occupant's room.

As shown in FIG. 14, in the above-identified front body structure, one mounting member 116, which is disposed in the forward direction of the vehicle body 110, acquires higher rigidity than the other mounting member 118 that is disposed in the rearward direction thereof, these mounting members being used to fix the acceleration sensors 112 to a front frame 114. This structure thus prevents the acceleration sensors 112 from retarding.

However, in such a front body structure, accelerations which act on the acceleration sensors 112 may vary depending on the rigidity of the vehicle body 110 and the like. The acceleration sensors 112 operate over a wide range of accelerations imparted to the vehicle body 110. Accordingly, it is extremely difficult from a technical viewpoint to ensure that the acceleration sensors 112 operate at a speed that is approximate to the predetermined acceleration value.

Another type of front body structure is recently known, in which a crush body is disposed in front of a front-side member so as to absorb a load imparted from the front of a vehicle body when the load is lower than a predetermined value, thereby eliminating deformation of the front-side member. (For this structure, reference is made, for example, to Japanese Patent Application Laid-Open No. 2-175452.) Accordingly, it is preferable in this case that the acceleration sensors 112 operate while the crush box is in the process of deformation, thereby activating the air bag device.

SUMMARY OF THE INVENTION

In view of the above-described fact, an object of the present invention is to provide a front body structure, which can sufficiently absorb energy of a load applied from the front of a vehicle body, and can then ensure that an acceleration sensor will actuate at a speed that is approximate to the predetermined acceleration value.

The front body structure according to the present invention, which incorporates a vehicle having the acceleration sensor, comprises: a front-side member, which is disposed on the vehicle body; and, a crush box, which is provided in front of the front-side member so as to exhibit a total plastic characteristic, when under load, in two stages.

Accordingly to the present invention with the above construction, when a load is imparted from the front of the vehicle body, axially compressive deformation will initially occur at the crush box at a portion thereof where a total plastic characteristic, when under load, is lower. Thereafter, axially compressive deformation will occur at the crush box at a portion where a total plastic characteristic, when under load, is higher. To be specific, a high deceleration will be imparted to the vehicle body, thereby introducing a great change in load which acts on the acceleration sensor after the axially compressive deformation is completed in the crush box at the portion where total plastic characteristic, when under load, is lower and then begins occurring in the crush box at the portion where total plastic characteristic, when under load, is higher. Such variations in load permit the acceleration sensor to activate an air bag device which is provided in a vehicle occupant's room. Thus, the crush box ensures that the acceleration sensor will be actuated at a speed approximate to a predetermined acceleration value. The crush box then can sufficiently absorb energy of the load which is imparted from the front of the vehicle body, thereby subjecting the front-side member to less damage.

In a front body structure according to a second aspect of the present invention, the crush box includes a front section, which is formed by thinner plate members, and a rear section, which is formed by thicker plate members.

According to the present invention with the above construction, the front section of the crush box exhibits a lower level of total plastic characteristic, when under load, than the rear section thereof because plate thickness in the front section is less than in the rear section. In the crush box, the axially compressive deformation is thereby introduced initially in the front section and then in the rear section upon imparting the load from the front of the vehicle body. As a result, benefits therefrom, which are similar to those of the front body structure according to the above-described first aspect, are obtained.

In a front body structure according to a third aspect of the present invention, the crush box includes four plate members in which two pairs of opposed plate members are configured to have a substantially rectangular cross-section, and wherein step portions are formed at opposite locations on the opposed plate members from one of the two pairs, in order that a front section of the crush box from the step portions in the longitudinal direction of the vehicle has a smaller cross-sectional area than a rear section of the crush box from the step portions in the longitudinal direction of the vehicle.

According to the present invention with the above construction, the front section of the crush box provides a lower level of total plastic characteristic, when under load, than the rear section thereof because the front section of the crush box from the step portions is smaller in cross-sectional area than the rear section thereof from the step portions. In the crush box, the axially compressive deformation is thereby introduced initially into the front section and thereafter into the rear section when the load is imposed from the front of the vehicle body. As a result, benefits therefrom, which are similar to those of the front body structure according to the above-described first aspect, are obtained.

A front body structure according to a fourth aspect of the present invention relies on the front body structure according to the third aspect, further comprising a reinforcing member which is interposed between the step portions so as to reinforce the step portions.

According to the present invention with the above structure, the reinforcing member for reinforcing the step portions is interposed between the step portions which are provided in the front body structure according to the third aspect. Thus, this structure reduces the likelihood that the step portions are crushed so as to deform their cross-sectional shapes, as compared with the front body structure according to the third aspect. Then again, this can ensure that the axially compressive deformation will be introduced in the crush box in sequence from the front section to the rear section thereof upon imparting the load from the front of the vehicle body.

In a front body structure according to a fifth aspect of the present invention, the crush box includes: a first enclosed cross-sectional configuration, which occupies a front section of the crush box; a second enclosed cross-sectional configuration, which occupies a rear section of the crush box so as to form substantially the same cross-sectional shape as that of the first enclosed cross-sectional configuration, but having a wider cross-sectional area than the first enclosed cross-sectional configuration; and, a wall surface portion, which is interposed between the first enclosed cross-sectional configuration and the second enclosed cross-sectional configuration so as to be connected therebetween, thereby allowing the first enclosed cross-sectional configuration to be driven into the second enclosed cross-sectional configuration upon imparting a lighter load than when producing the axially compressive deformation in the first enclosed cross-sectional configuration as well as the second enclosed cross-sectional configuration.

According to the present invention with the above structure, upon imparting the load from the front of the vehicle body, the wall surface portion of the crush box will be crushed before axially compressive deformation occurs in the front section and the rear section of the crush box. Subsequently, the first enclosed cross-sectional configuration, which forms the front section of the crush box, is driven into the second enclosed cross-sectional configuration that forms the rear section thereof. When axially compressive deformation begins occurring in the front section of the crush box, a high deceleration will then be imparted to the vehicle body, thereby introducing a great change in the load which acts on the acceleration sensor. Furthermore, when the axially compressive deformation is completed in the front section of the crush box and then begins occurring in the rear section thereof, a high deceleration will then be imparted to the vehicle body again, thereby causing a great change in the load which acts on the acceleration sensor. Accordingly, these two load variations permit the acceleration sensor to operate properly.

In a further front body structure according to a sixth aspect of the present invention, the crush box includes four plate members in which two pairs of opposed plate members are formed into an enclosed cross-sectional configuration having a substantially rectangular cross-section, which extends in the longitudinal direction of the vehicle, and wherein each of the opposed plate members from one of said two pairs has a substantially rectangular cross-section because of opposite wall portions extending in a vertical direction of the vehicle, each of the wall portions including a front section of a smaller width and a rear section of a larger width, while the other of the two pairs has planar plate members.

According to the present invention with the above construction, each of the opposed plate members from one of the two pairs has the substantially rectangular cross-section, with each of the opposite wall portions extending in the vertical direction of the vehicle being made up of the front section of a smaller width and the rear section of a larger width. Accordingly, a front section of the crush box, at which the wall portions of smaller width is located, provides a lower level of total plastic characteristic, when under load, than a rear section thereof where the wall portions of a larger width is provided. The axially compressive deformation is thereby introduced initially in the front section of the crush box and thereafter in the rear section thereof upon imparting the load from the front of the vehicle body. As a consequence, benefits therefrom, which are similar to those of the front body structure according to the first aspect of the present invention, are obtained.

In yet another front body structure according to a seventh aspect of the present invention, the crush box includes four plate members in which two pairs of opposed plate members are formed into an enclosed cross-sectional configuration having a substantially rectangular cross-section, which extends in the longitudinal direction of the vehicle, and wherein each of the opposed plate members from one of said two pairs has a substantially rectangular cross-section, while each of the opposed plate members from the other of the two pairs includes a planar front section and a rear section which has a substantially rectangular cross-section.

According to the present invention with the above structure, the crush box forms the enclosed cross-sectional configuration having the substantially rectangular cross-section, which extends in the longitudinal direction of the vehicle. Corner portions in a front section of the crush box are each formed by one plate member, while those in a rear section thereof are each formed by two plate members one over the other. Accordingly, the front section of the crush box presents a lower level of total plastic characteristic, when under load, than the rear section thereof because a load is experienced by the corner portions in accordance with Kalman's effective width theory. In the crush box, axially compressive deformation is thereby introduced initially in the front section and thereafter in the rear section when the load is imparted from the front of the vehicle body. As a consequence, benefits therefrom, which are similar to those of the front body structure according to the first aspect of the present invention, are obtained.

As previously described, the front body structure according to the present invention comprises: the front-side member; and, the crush box, which is disposed in front of the front-side member to exhibit a total plastic characteristic, when under load, in two stages. As a consequence, the front body structure offers improved benefits in which: energy of the load imparted from the front of the vehicle body can sufficiently be absorbed; and, the acceleration sensor can be actuated at a speed approximate to the predetermined acceleration.

BRIEF DESCRIPTION OF THE DRAWINGS

FIG. 9 is a line graph, which represents a relationship between a deformation amount and an axially compressive deformation load to the crush box of the front body structure according to the fourth embodiment;

FIG. 10A is an exploded perspective view, when seen diagonally from the front of the outer vehicle body, illustrating a crush box of a front body structure according to a fifth embodiment;

FIG. 10B is a cross-sectional view taken along line B—B of FIG. 10A;

FIG. 10C is a cross-sectional view taken along line C—C of FIG. 10A;

FIG. 11A is an exploded perspective view, when seen diagonally from the front of the outer vehicle body, illustrating a variation in the crush box of the front body structure according to the fifth embodiment;

FIG. 11B is a cross-sectional view taken along line B—B of FIG. 11A;

FIG. 11C is a cross-sectional view taken along line C—C of FIG. 11A;

FIG. 11D is a cross-sectional view, showing an example of a further variation in the crush box shown in FIG. 11C;

FIG. 12A is an exploded perspective view, when seen diagonally from the front of the outer vehicle body, illustrating a crush box of a front body structure according to a sixth embodiment;

FIG. 12B is a cross-sectional view taken along line B—B of FIG. 12A;

FIG. 12C is a cross-sectional view taken along line C—C of FIG. 12A;

DESCRIPTION OF THE PREFERRED EMBODIMENTS

A first embodiment of a front body structure according to the present invention will now be described with reference to FIG. 1 through FIG. 4. Note that arrows "FR", "UP", and "IN", shown in the accompanying drawings, respectively represent: the forward direction of a vehicle; the upward direction thereof; and, an inward direction thereof relative to a transverse axis of the vehicle.

Figure 1:
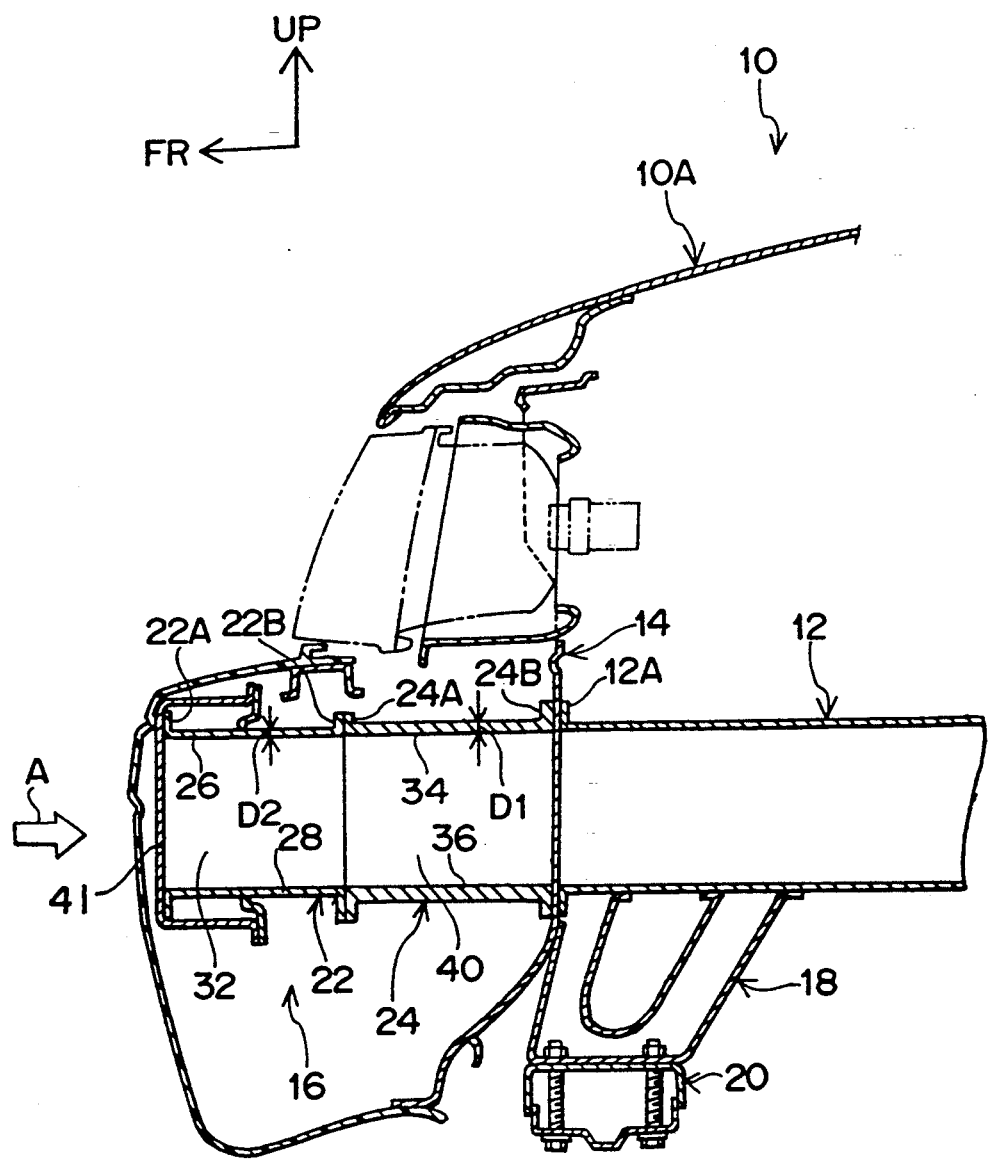
FIG. 1 is a side view, showing a front body structure according to a first embodiment of the present invention.

FIG. 1 illustrates a front body section 10A of a motor vehicle body 10, in which a pair of front-side members 12 is disposed in the vicinity of lower-both sides of the front body section 10A in a transverse direction of the vehicle. The front-side members 12 forms an enclosed cross-sectional configuration, which extends in a longitudinal direction of the vehicle. At a front end portion of the front-side member 12, a flange 12A is provided, which in turn is connected to a front end panel 14.

A crush box 16 is disposed in front of the front-side member 12 so as to be axially aligned and connected thereto via the front end panel 14. A front cross member 20, which extends in the transverse direction of the vehicle, is connected to the bottom of the front end portion of the front-side member 12 via a connecting member 18.

Figure 2:
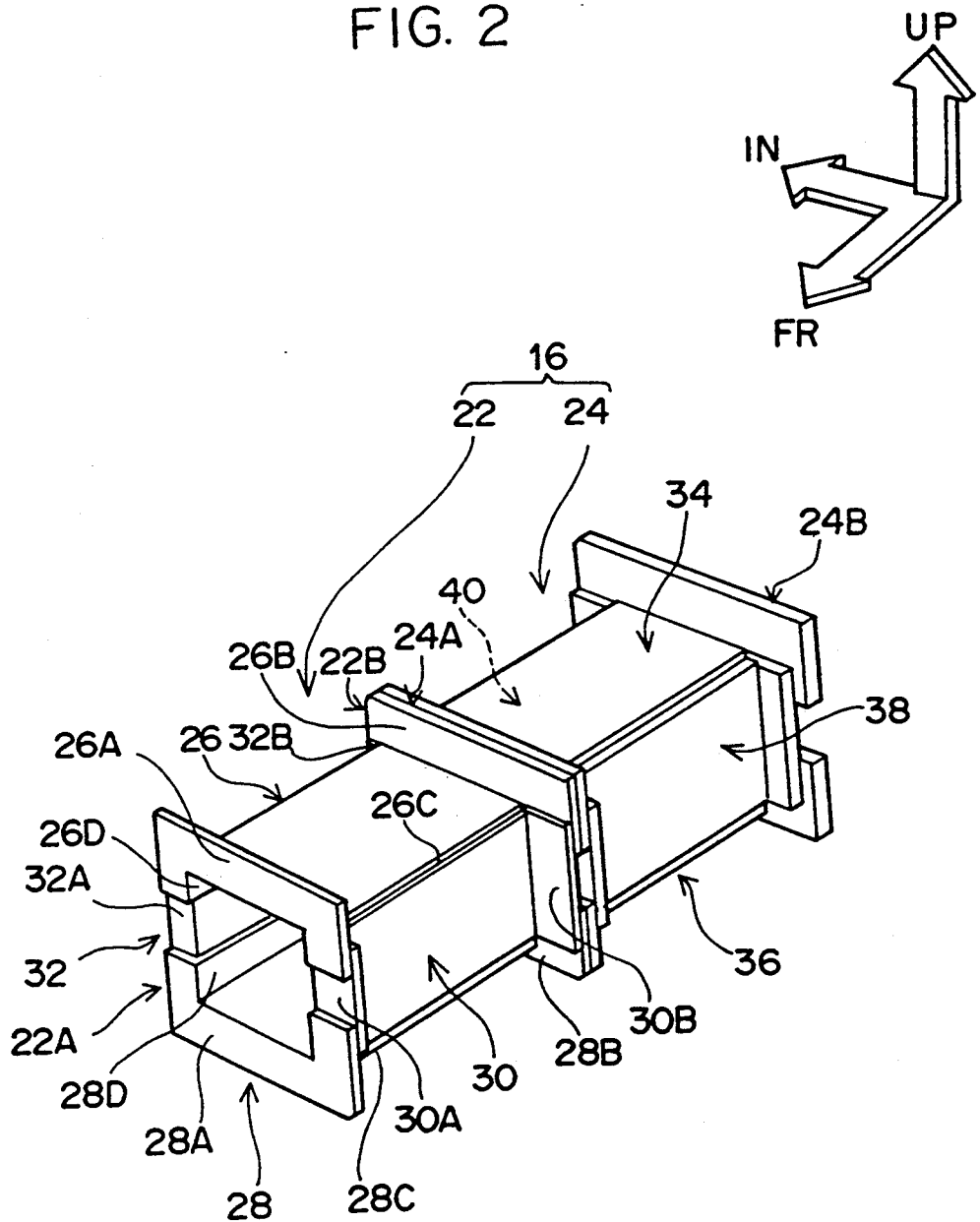
FIG. 2 is a perspective view, when seen diagonally from the front of an outer vehicle body, illustrating a crush box of the front body structure according to the first embodiment.

FIG. 2 illustrates the crush box 16, which includes a front section 22 and a rear section 24. The front section 22 further includes: an upper plate 26, which forms an upper portion of the front section 22; a lower plate 28, which forms a lower portion thereof; an outer plate 30, which forms an outer portion thereof in the transverse direction of the vehicle; and, an inner plate 32, which forms an inner portion thereof in the transverse direction of the vehicle.

The upper plate 26 has a substantially rectangular cross-section, with an opening thereof being oriented downward. The upper plate 26 is formed with flanges 26A and 26B respectively at a front end portion and a rear end portion of the upper plate 26. The flanges 26A and 26B extend radially outward from the cross-section of the upper plate 26.

The lower plate 28 has a substantially rectangular cross-section, with an opening thereof being oriented upward. The lower plate 28 is formed with flanges 28A and 28B respectively at a front end portion and a rear end portion of the lower plate 28. The flanges 28A and 28B extend radially outward from the cross-section of the lower plate 28.

The outer plate 30, which has a planar shape, is formed with flanges 30A and 30B respectively at a front end portion and a rear end portion of the outer plate 30. The flanges 30A and 30B extend outward in the transverse direction of the vehicle. An upper edge portion of the outer plate 30 is welded to an outer wall portion 26C of the upper plate 26 from the outside in the transverse direction of the vehicle. A lower edge portion of the outer plate 30 is welded to an outer wall portion 28C of the lower plate 28 from the outside in the transverse direction of the vehicle. From the rear in the longitudinal direction of the vehicle, an upper end portion of the flange 30A is welded to the flange 26A at an outwardly extending underside of the flange 26A in the transverse direction of the vehicle. From the rear in the longitudinal direction of the vehicle, a lower end portion of the flange 30A is welded to the flange 28A at an outwardly extending upper portion of the flange 28A in the transverse direction of the vehicle.

The inner plate 32, which has a planar shape, is formed with flanges 32A and 32B respectively at a front end portion and a rear end portion of the inner plate 32. The flanges 32A and 32B extend inward in the transverse direction of the vehicle. An upper edge portion of the inner plate 32 is welded to an inner wall portion 26D of the upper plate 26 from the inside in the transverse direction of the vehicle. A lower edge portion of the inner plate 32 is welded to an inner wall portion 28D of the lower plate 28 from the inside in the transverse direction of the vehicle. From the rear in the longitudinal direction of the vehicle, an upper end portion of the flange 32A is welded to the flange 26A at an inwardly extending underside of the flange 26A in the transverse direction of the vehicle. From the rear in the longitudinal direction of the vehicle, a lower end portion of the flange 32A is welded to the flange 28A at an inwardly extending upper portion of the flange 28A in the transverse direction of the vehicle.

Thus, the front section 22 of the crush box 16 is an enclosed cross-sectional configuration having a substantially rectangular cross-section, which extends in the longitudinal direction of the vehicle.

The rear section 24 of the crush box 16 includes: an upper plate 34, which forms an upper portion of the rear section 24; a lower plate 36, which forms a lower portion thereof; an outer plate 38, which forms an outer portion thereof in the transverse direction of the vehicle; and, an inner plate 40, which forms an inner portion thereof in the transverse direction of the vehicle. The upper plate 34, the lower plate 36, the outer plate 38, and the inner plate 40 are respectively of the same form as the upper plate 26, the lower plate 28, the outer plate 20, and the inner plate 32 of the front section 22. These plate members of the rear section 24 are combined together in the same way as those plate members in the front section 22.

Thus, the rear section 24 of the crush box 16 also forms an enclosed cross-sectional configuration having a substantially rectangular cross-section, which extends in the longitudinal direction of the vehicle.

Furthermore, in the crush box 16, a flange 24A at a front end portion of the rear section 24 is coupled to a flange 22B which includes the flanges 26B, 28B, 30B, and 32B at a rear end portion of the front section 22. The front section 22 and the rear section 24 are thereby axially aligned.

FIG. 1 shows the crush box 16, in which each thickness D1 of the upper plate 34, the lower plate 36, the outer plate 38 (not shown), and the inner plate 40 in the rear section 24 is larger than each thickness D2 of the upper plate 26, the lower plate 28, the outer plate 30 (not shown), and the inner plate 32 in the front section 22.

FIG. 2 shows the crush box 16 in which a flange 22A includes the flanges 26A, 28A, 30A, and 32A at the front end portion of the front section 22. Referring back to FIG. 1, the above-noted flange 22A is connected to a bumper reinforcing member 41. At the rear end portion of the rear section 24 of the crush box 16, a flange 24B is provided, which in turn is coupled to the flange 12A of the front-side member 12 through the front end panel 14.

Figure 3:
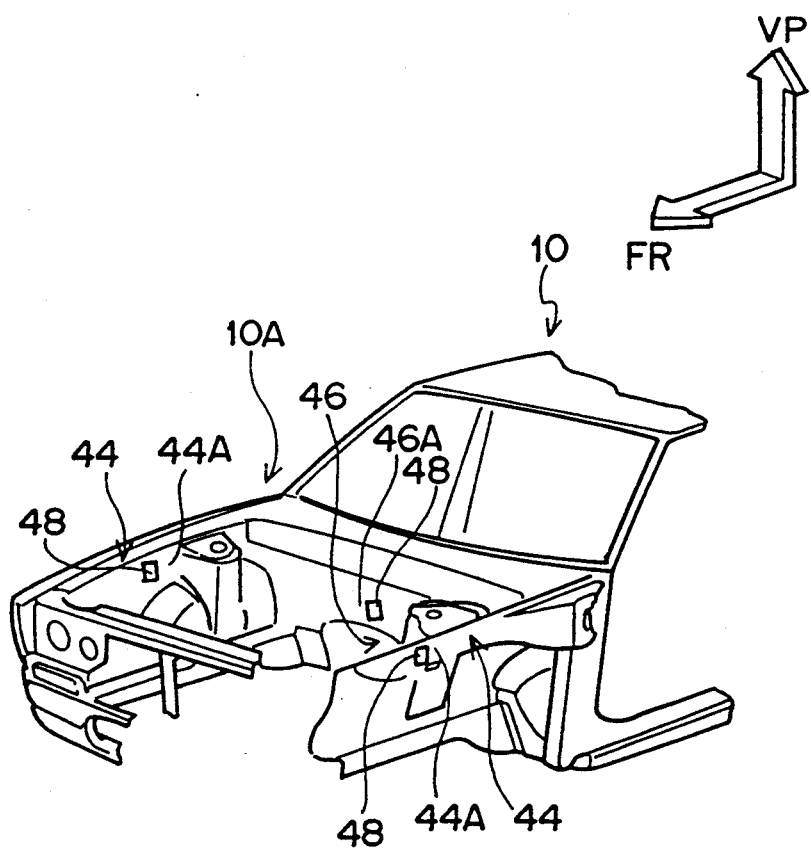
FIG. 3 is a perspective view, when seen diagonally from the front of the vehicle body, illustrating a front half of a vehicle body which employs the front body structure according to the first embodiment.

FIG. 3 illustrates the front body section 10A, in which apron upper members 44 are provided at opposite sides thereof. An acceleration sensor 48 is disposed either at a substantially central portion 44A of the apron upper member 44 in the longitudinal direction of the vehicle or at a front end portion 46A of a floor tunnel portion 46.

Alternatively, plate members, which are used in the rear and front sections, may be of the same thickness, but may be made of different materials between the rear section and the front section so that the front section acquires a lower level of a total plastic characteristic, when under load, than the rear section.

Next, operation of the present embodiment will be described.

Figure 4:
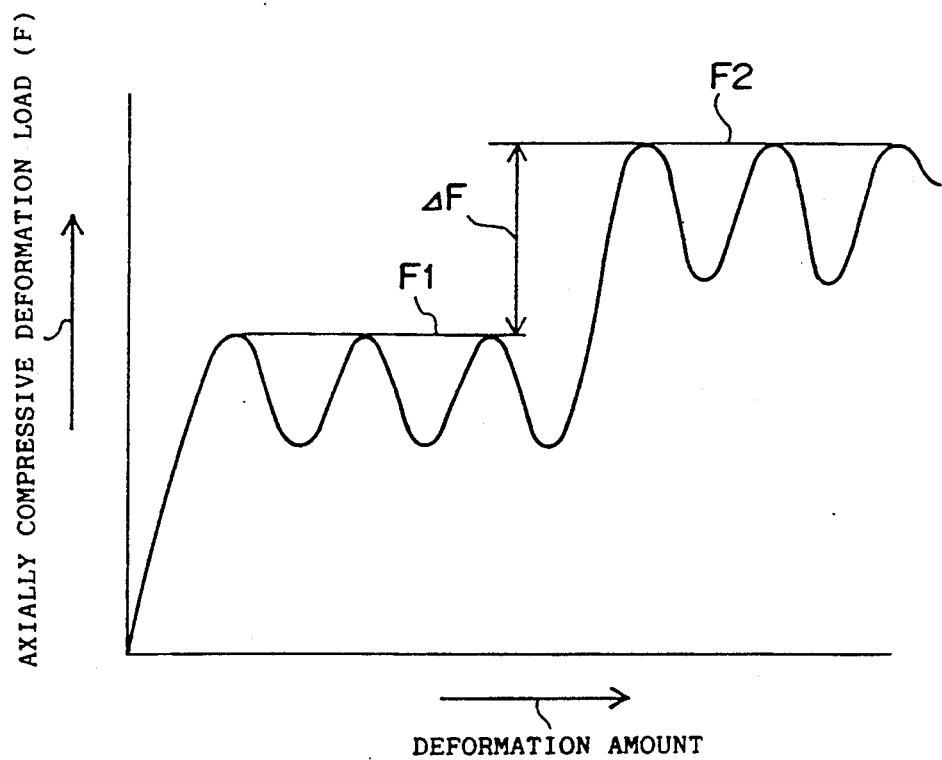
FIG. 4 is a line graph, which represents a relationship between a deformation amount and an axially compressive deformation load to the crush box of the front body structure according to the first embodiment.

In the front body structure according to the present embodiment, when a load is imparted from the front of a vehicle body (as shown by arrow A in FIG. 1), axially compressive deformation will occur in the crush box 16 before developing in the front-side member 12. In this case, the front section 22 of the crush box 16 presents a lower level of total plastic characteristic, when under load, than the rear section 24 because, in the rear section 24 of the crush box 16, each thickness D1 of the upper plate 34, the lower plate 36, the outer plate 38, and the inner plate 40 is larger than each thickness D2 of the upper plate 26, the lower plate 28, the outer plate 30, and the inner plate 32 is the front section 22 of the crush box 16. In the crush box 16, the axially compressive deformation is thereby introduced initially into the front section 22 and then into the rear section 24. As shown in FIG. 4, this means that an axially compressive deformation load F1 in the front section 22 is lower than an axially compressive deformation load F2 in the rear section 24 (i.e, $F2-F1=\Delta F$). Consequently, when the axially compressive deformation is completed in the front section 22 and then begins occurring in the rear section 24, rapid vehicle body deceleration will occur. Therefore, a large change in load will act on the acceleration sensor 48.

Such variations in the load operate the acceleration sensor 48 to activate an air bag device which is provided in the vehicle occupant's room. Accordingly, the crush box 16 ensures that the acceleration sensor 48 will be activated at a speed approximate to the predetermined acceleration. Furthermore, the crush box 16 sufficiently absorbs the energy of the load which is imparted from the front of the vehicle body, thereby subjecting the front-side member 12 to less damage.

Next, a second embodiment of the front body structure according to the present invention will be described with reference to FIG. 5. Note that the same reference numbers are hereinafter given for components identical to those described in the first embodiment; therefore, descriptions related thereto will be omitted.

Figure 5:
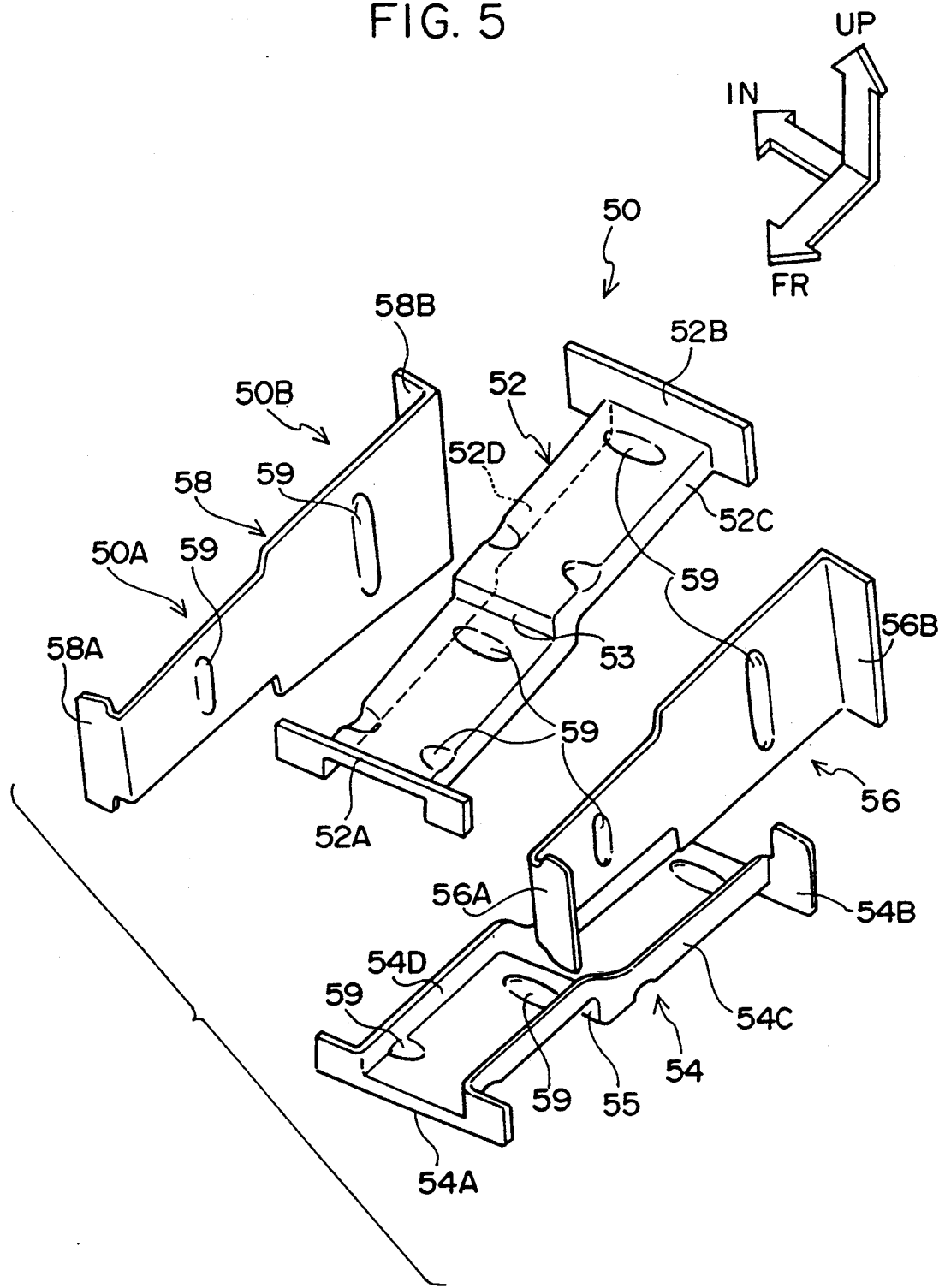
FIG. 5 is an exploded perspective view, when seen diagonally from the front of the outer vehicle body, illustrating a crush box of a front body structure according to a second embodiment.

FIG. 5 illustrates a crush box 50 according to the present embodiment. The crush box 50 includes: an upper plate 52, which forms an upper portion of the crush box 50; a lower plate 54, which forms a lower portion thereof; an outer plate 56, which forms an outer portion thereof in the transverse direction of the vehicle; and, an inner plate 58, which forms an inner portion thereof in the transverse direction of the vehicle.

The upper plate 52 has a substantially rectangular cross-section, with an opening thereof being oriented downward. The upper plate 52 is formed with flanges 52A and 52B respectively at a front end portion and a rear end portion of the upper plate 52. The flanges 52A and 52B extend radially outward from the cross-section of the upper plate 52. A step portion 53 is provided at a central portion of the upper plate 52 in the longitudinal direction thereof. In addition, a front half of the upper plate 52 from the step portion 53 is downwardly offset with respect to a rear half of the upper plate 52 therefrom.

The lower plate 54 has a substantially rectangular cross-section, with an opening thereof being oriented upward. The lower plate 54 is formed with flanges 54A and 54B respectively at a front end portion and a rear end portion of the lower plate 54. The flanges 54A and 54B extend radially outward from the cross-section of the lower plate 54. A step portion 55 is provided at a central portion of the lower plate 54 in the longitudinal direction thereof. In addition, a front half of the lower plate 54 from the step portion 53 is upwardly offset with respect to a rear half of the lower plate 54.

The outer plate 56, which has a planar shape, is formed with flanges 56A and 56B at a front end portion and a rear end portion of the outer plate 56, respectively. The flanges 56A and 56B extend outward in the transverse direction of the vehicle. A front half of the outer plate 56 from a central portion of the outer plate 56 in the longitudinal direction thereof has a smaller width than a rear half of the outer plate 56. An upper edge portion of the outer plate 56 is welded to an outer wall portion 52C of the upper plate 52 from the outside in the transverse direction of the vehicle. A lower edge portion of the outer plate 56 is welded to an outer wall portion 54C of the lower plate 54 from the outside in the transverse direction of the vehicle. The flange 56A of the outer plate 56 has an upper end portion which extends upward therefrom. From the rear in the longitudinal direction of the vehicle, the above-noted upper end portion of the flange 56A is welded to the flange 52A at an outwardly extending underside of the flange 52A in the transverse direction of the vehicle. The flange 56A has a lower end portion which extends downward therefrom. From the rear in the longitudinal direction of the vehicle, the above-noted lower end portion of the flange 56A is welded to the flange 54A at an outwardly extending upper portion of the flange 54A in the transverse direction of the vehicle.

The inner plate 58, which has a planar shape, is formed with flanges 58A and 58B at a front end portion and a rear end portion of the inner plate 58, respectively. The flanges 58A and 58B extend inward in the transverse direction of the vehicle. A front half of the inner plate 58 from a central portion of the inner plate 58 in the longitudinal direction thereof has a smaller width than a rear half of the inner plate 58. An upper edge portion of the inner plate 58 is welded to an inner wall portion 52D of the upper plate 52 from the inside in the transverse direction of the vehicle. A lower edge portion of the inner plate 58 is welded to an inner wall portion 54D of the lower plate 54 from the inside in the transverse direction of the vehicle. The flange 58A of the inner plate 58 has an upper end portion which extends upward therefrom. From the rear in the longitudinal direction of the vehicle, the above-noted upper end portion of the flange 58A is welded to the flange 52A at an inwardly extending underside of the flange 52A in the transverse direction of the vehicle. The flange 58A has a lower end portion which extends downward therefrom. From the rear in the longitudinal direction of the vehicle, the above-noted lower end portion of the flange 58A is welded to the flange 54A at an inwardly extending upper portion of the flange 54A in the transverse direction of the vehicle.

Beads 59 are formed on each of the upper plate 52, the lower plate 54, the outer plate 56, and the inner plate 58 in a direction perpendicular to a lengthwise direction of the crush box 50 (i.e., to the longitudinal direction of the vehicle).

Thus, the crush box 50 forms an enclosed cross-sectional configuration having a substantially rectangular cross-section, which extends in the longitudinal direction of the vehicle. In addition, the crush box 50 includes a front section 50A and a rear section 50B, in which a cross-sectional area of the front section 50A in the vertical direction of the vehicle is smaller than that of the rear section 50B. Consequently, in the crush box 50, the front section 50A exhibits a lower level of total plastic characteristic, when under load, than the rear section 50B. In the crush box 50, axially compressive deformation is thereby introduced initially at the front section 50A and then at the rear section 50B upon imparting a load from the front of the vehicle body. Again, benefits are gained from the present embodiment, which are similar to those of the first embodiment. Furthermore, in comparison with the first embodiment, the present embodiment uses as few as four plate members of the same thickness, thereby allowing for a simplified structure.

A third embodiment of the front body structure according to the present invention will now be described with reference to FIG. 6A and FIG. 6B. Note that the same reference numbers are hereinafter given for components identical to those described in the second embodiment; therefore, descriptions related thereto will be omitted.

Figure 6A:
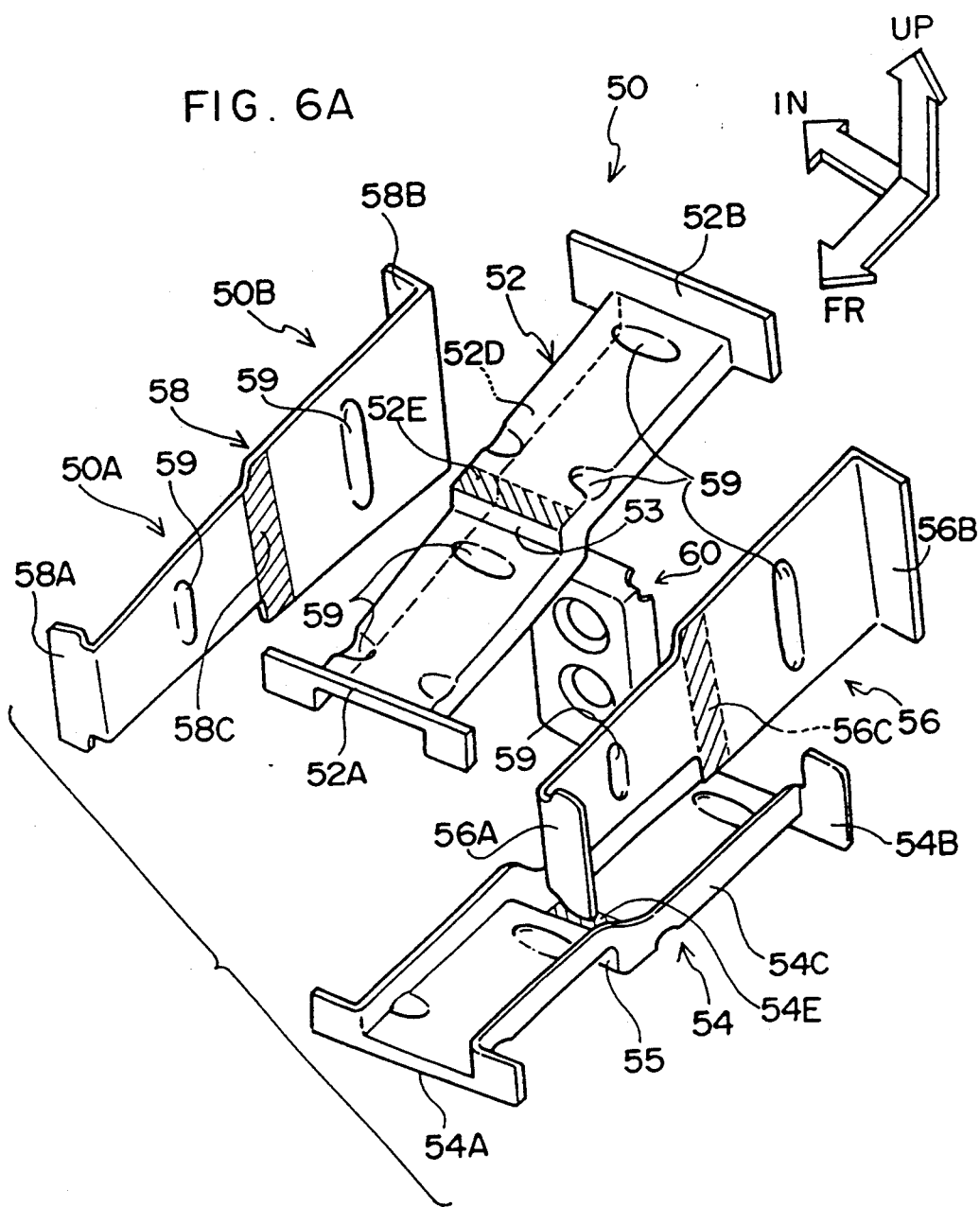
FIG. 6A is an exploded perspective view, when seen diagonally from the front of the outer vehicle body, illustrating a crush box of a front body structure according to a third embodiment.

FIG. 6A illustrates the present embodiment, in which a bulkhead 60 acting as a reinforcing member is interposed between a front section 50A and a rear section 50B of a crush box 50, i.e., at a location where the bulkhead 60 is held against step portions 53 and 55, which are respectively formed on an upper plate 52 and a lower plate 54.

Figure 6B:
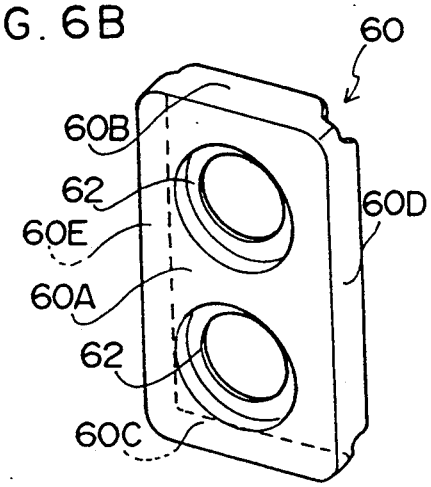
FIG. 6B is an enlarged perspective view showing a bulkhead.

FIG. 6B illustrates the bulkhead 60, which is in the form of a vertically extending rectangle. A base portion 60A of the bulkhead 60 is provided with two circularly punched holes 62, which are spaced apart from one another in the vertical direction of the bulkhead 60. An upper flange 60B, a lower flange 60C, an outer flange 60D, and an inner flange 60E are formed around the outer periphery of the base portion 60A, all of which extend rearward in the longitudinal direction of the vehicle.

As shown in FIG. 6A, an upper end portion of the base portion 60A of the bulkhead 60 is held against the step portion 53 of the upper plate 52 from the rear in the longitudinal direction of the vehicle. The upper flange 60B is thereby welded to a rear side portion 52E (as shown by slanted lines in FIG. 6A) of the step portion 53. A lower end portion of the base portion 60A of the bulkhead 60 is held against the step portion 55 of the lower plate 54 from the rear in the longitudinal direction of the vehicle. The lower flange 60C is thereby welded to a rear side portion 54E (as shown by slanted lines in FIG. 6A) of the step portion 55. The outer flange 60D of the bulkhead 60 is welded to a front end portion 56C (as shown by slanted line in FIG. 6A) of the rear section 50B of the outer plate 56. The inner flange 60E of the bulkhead 60 is welded to a front end portion 58C (as shown by slanted lines in FIG. 6A) of the rear section 50B of the inner plate 58.

The bulkhead 60 according to the present embodiment thus reinforces the step portions of the crush box 50, thereby reducing the likelihood that the step portions may be crushed to deform their cross-sections, as compared with the front body structure according the second embodiment. Further, this can ensure that axially compressive deformation will be introduced into the crush box 50 in sequence from the front section to the rear section thereof.

A fourth embodiment of the front body structure according to the present invention will now be described with reference to FIG. 7 through FIG. 8F. Note that the same reference numbers are hereinafter given for components identical to those described in the first embodiment; therefore, descriptions related thereto will be omitted.

Figure 7:
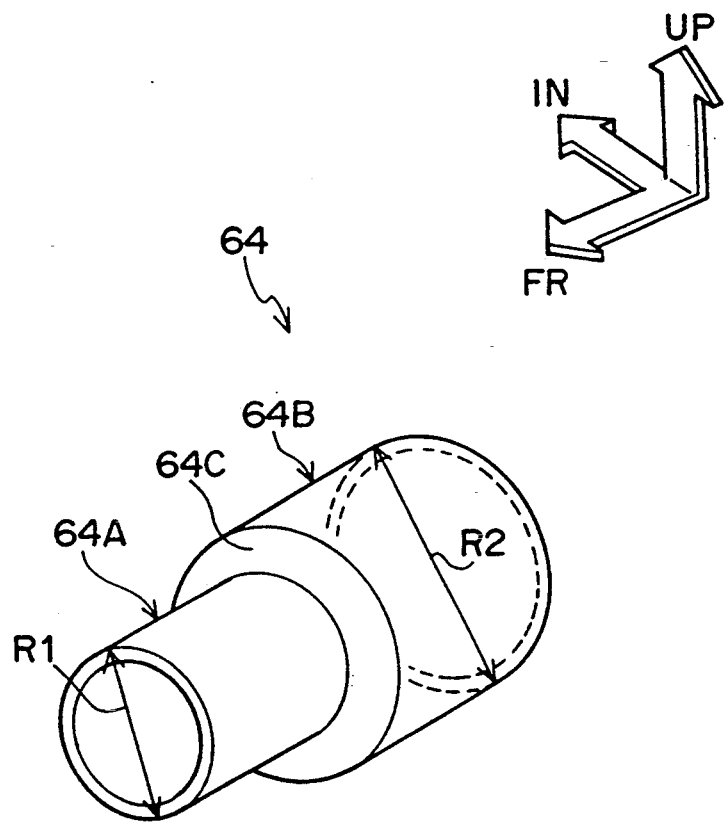
FIG. 7 is a perspective view, when seen diagonally from the front of the outer vehicle body, illustrating a crush box of a front body structure according to a fourth embodiment.

FIG. 7 illustrates a cylindrical crush box 64 according to the present embodiment, in which a front section 64A of the crush box 64 has a smaller outer diameter R1 than outer diameter R2 of a rear section 64B thereof. The front section 64A and the rear section 64B are combined together via an annular wall surface portion 64C. The wall surface portion 64C is such that it can be crushed, upon applying a load lighter than when producing axially compressive deformation to the front section 64A and the rear section 64B. The front section 64A is thereby driven into the rear section 64B.

Figure 8A:
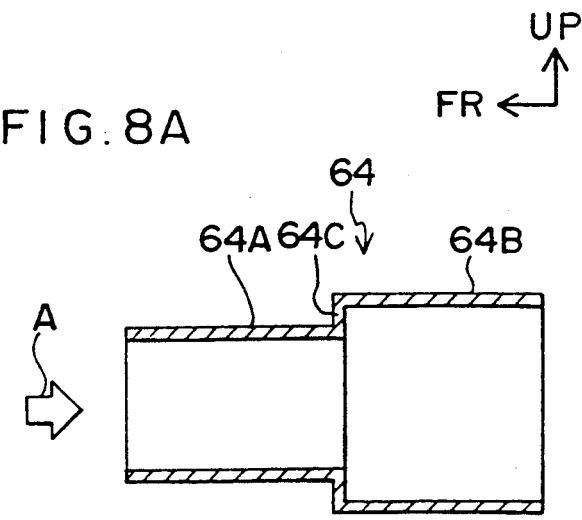
FIGS. 8A through 8F are sectional side views, illustrating a deformation process of the crush box according to the fourth embodiment.
Figure 8F:
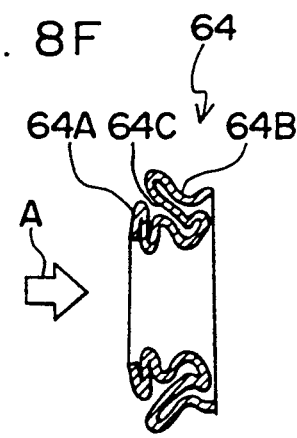
Figure 8B:
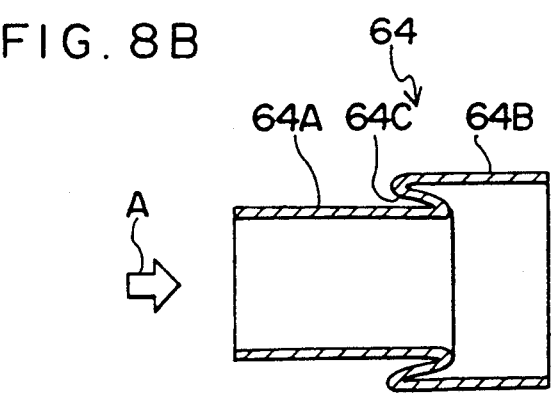
Figure 8E:
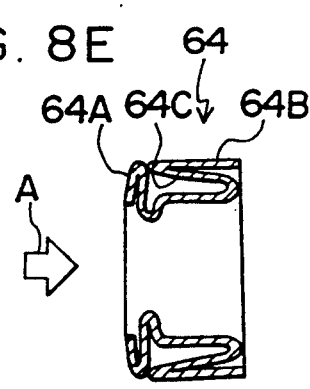

Accordingly, in the present embodiment, as shown in FIGS. 8A and 8B, initially, the wall surface portion 64C is crushed upon imparting a load from the front of the vehicle body (as shown by arrow A in FIG. 8A). The front section 64A is thereby driven into the rear section 64B, which results in a state shown in FIG. 8C. As shown in FIG. 8D, axially compressive deformation will then begin occurring in the front section 64A, which results in a state shown in FIG. 8E. Subsequently, axially compressive deformation will occur in the rear section 64B, as shown in FIG. 8F.

Figure 8C:
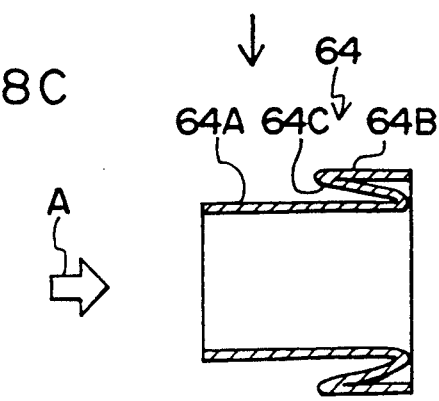
Figure 8D:
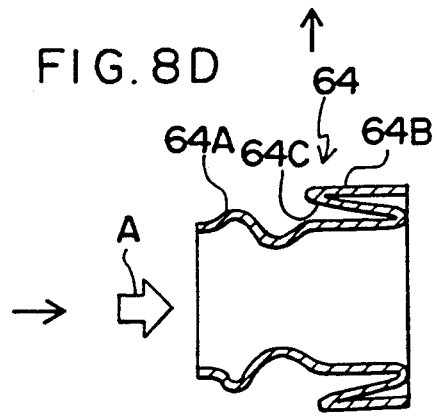
Figure 13:
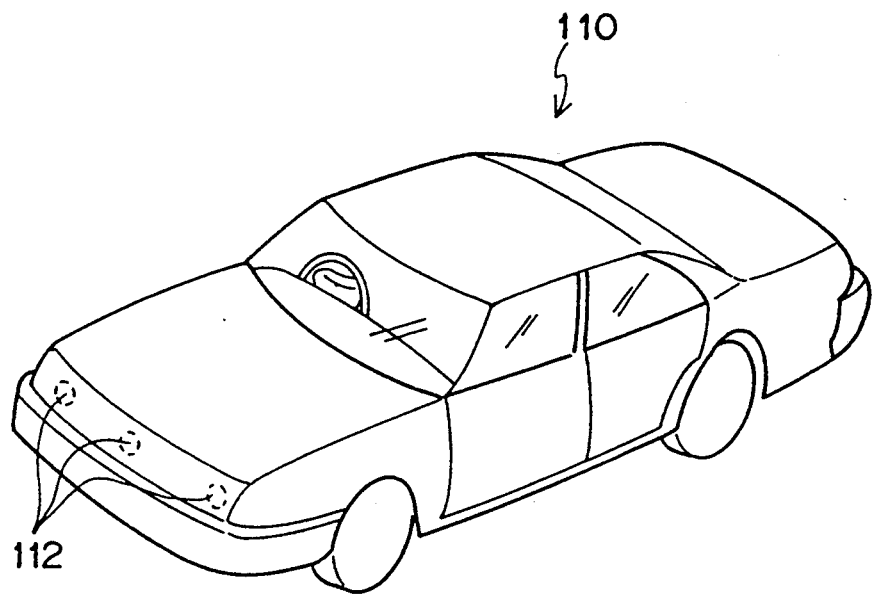
FIG. 13 is a perspective view, when seen diagonally from the front of a vehicle body, which uses a conventional front body structure.
Figure 14:
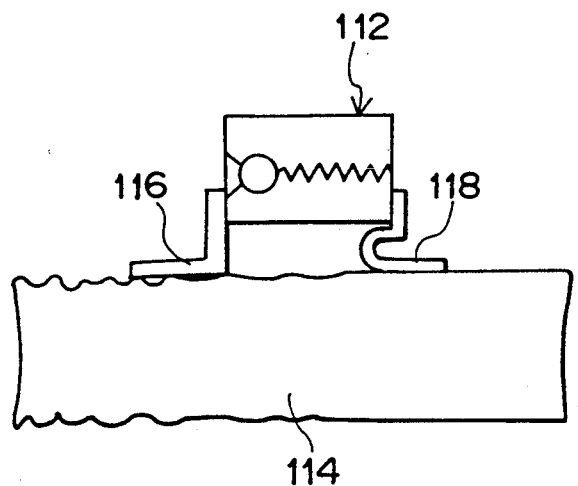
FIG. 14 is a side view, showing a structure for mounting an acceleration sensor to the vehicle body which uses the conventional front body structure.

In this way, the present embodiment is of a process illustrated in FIGS. 8A through 8C, in which the wall surface portion 64C is crushed so as to drive the front section 64A into the rear section 64B before axially compressive deformation occurs in the front section 64A and the rear section 64B of the crush box 64. Accordingly, as shown in FIG. 9, there are the following zones: zone P1, in which a high deceleration is imparted to the vehicle body, thereby introducing a great change in load which acts on the acceleration sensor 48 after the state of FIG. 8C turns to that of FIG. 8D; and, zone P2, in which a high deceleration is imparted to the vehicle body, thereby introducing a great change in the above-identified load when axially compressive deformation is completed in the front section 64A and then begins occurring in the rear section 64B, i.e., after the state of FIG. 8E turns to that of FIG. 8F.

Accordingly, one of the above two zones P1 and P2 can bring the acceleration sensor 48 into action. In addition, in view of a load which affects the front-side members 12, the front body structure according to the present embodiment allows the acceleration sensor 48 to operate with in zone P1.

A fifth embodiment of the front body structure according to the present invention will now be described with reference to FIG. 10A through FIG. 10C. Note that the same reference numbers are hereinafter given for components identical to those described in the first embodiment; therefore, descriptions related thereto will be omitted.

FIG. 10A illustrates a crush box 66, which includes: an upper plate 68, which forms an upper portion of the crush box 66; a lower plate 70, which forms a lower portion thereof; an outer plate 72, which forms an outer portion thereof in the transverse direction of the vehicle; and, an inner plate 74, which forms an inner portion thereof in the transverse direction of the vehicle.

The upper plate 68 has a substantially rectangular cross-section, with an opening thereof being oriented downward. An outer wall portion 68A of the upper plate 68 includes a front section and a rear section, which are integrally combined together at a central portion of the outer wall portion 68A, the central portion having a tapered lower edge portion. Width H1 of the front section is smaller than width H2 of the rear section. Similarly, an inner wall portion 68B of the upper plate 68 includes a front section and a rear section, which are integrally combined together at a central portion of the inner wall portion 68B, the central portion having a tapered lower edge portion. Width H1 of the front section of the inner wall portion 68B is smaller than width H2 of the rear section thereof.

The lower plate 70 has a substantially rectangular cross-section, with an opening thereof being oriented upward. An outer wall portion 70A of the lower plate 70 includes a front section and a rear section, which are integrally combined together at a central portion of the outer wall portion 70A, the central portion having an tapered upper edge portion. Width H1 of the front section is smaller than width H2 of the rear section. Similarly, an inner wall portion 70B of the lower plate 70 includes a front section and a rear section, which are integrally combined together at a central portion of the inner wall portion 70B, the central portion having an tapered upper edge portion. Width H1 of the front section of the inner wall portion 70B is smaller than width H2 of the rear section thereof.

The outer plate 72, which has a planar shape, includes a front section and a rear section, which are integrally combined together at a central portion of the outer plate 72, the central portion having tapered upper and lower edge portions. Width L1 of the front section is larger than width L2 of the rear section. An upper edge portion of the outer plate 72 is welded to a lower edge portion of the outer wall portion 68A of the upper plate 68 from the outside in the transverse direction of the vehicle. A lower edge portion of the outer plate 72 is welded to an upper edge portion of the outer wall portion 70A of the lower plate 70 from the outside in the transverse direction of the vehicle.

The inner plate 74, which has a planar shape, includes a front section and a rear section, which are integrally combined together at a central portion of the inner plate 74, the central portion having tapered upper and lower edge portions. Width L1 of the front section is larger than width L2 of the rear section. An upper edge portion of the inner plate 74 is welded to a lower edge portion of the inner wall portion 68B of the upper plate 68 from the inside in the transverse direction of the vehicle. A lower edge portion of the inner plate portion 74 is welded to an upper edge portion of the inner wall portion 70B of the lower plate 70 from the inside in the transverse direction of the vehicle.

Thus, the crush box 66 forms an enclosed cross-sectional configuration having a substantially rectangular cross-section, which extends in the longitudinal direction of the vehicle.

As illustrated in FIGS. 10B and 10C, each thickness M1 of the upper plate 68 and the lower plate 70 is larger than each thickness M2 of the outer plate 72 and the inner plate 74. Furthermore, in a cross-section of the rear section 66B as illustrated in FIG. 10C, the inner wall portions 68B and 70B and the outer wall portions 68A and 70A, respectively, of the upper plate 68 and lower plates 70 have larger widths than in a cross-section of the front section 66A illustrated in FIG. 10B. As a result, the rear section 66B provides a higher level of total plastic characteristic, when under load, than the front section 66A.

Again, in the crush box 66 according to the present embodiment, axially compressive deformation is introduced first in the front section 66A and then in the rear section 66B upon imparting a load from the front of the vehicle body. Benefits from the present embodiment, which are similar to those of the first embodiment, are thereby obtained. In addition, the present embodiment uses a fewer number of plate members than the first embodiment, thereby making the complete crush box lighter.

FIG. 11A through FIG. 11D illustrate a variation of the fifth embodiment.

As illustrated in FIGS. 11A through 11C, a crush box 76 includes an outer plate 78 and an inner plate 80, both of which have a planar shape. Each thickness M3 of an upper plate 68, a lower plate 70, the outer plate 78, and the inner plate 80 is equal to each other. In a cross-section of a rear section 76B as illustrated in FIG. 11C, outer wall portions 68A and 70A and inner wall portions 68B and 70B, respectively, of the upper plate 68 and the lower plates 70 have larger widths than in a cross-section of a front section 76A illustrated in FIG. 11B. The rear section 76B thus provides a higher level of total plastic characteristic, when under load, than the front section 76A. Alternatively, the crush box 76 may include the rear section 76B which is configured, as illustrated in FIG. 11D. That is, each width H2 of the outer wall portions 68A and 70A and the inner wall portions 68B and 70B, respectively, of the upper plate 68 and the lower plate 70 is wider. The outer wall portion 68A and the inner wall portion 68B of the upper plate 68 are thereby fully overlaid, respectively, with the outer wall portion 70A and the inner wall portion 70B of the lower plate 70.

A sixth embodiment of the front body structure according to the present invention will now be described with reference to FIG. 12A through FIG. 12C. Note that the same reference numbers are hereinafter given for components identical to those described in the first embodiment; therefore, descriptions related thereto will be omitted.

A crush box according to the present embodiment is based on Kalman's effective width theory.

FIGS. 12A through 12C illustrate a crush box 82, which includes: an upper plate 84, which forms an upper portion of the crush box 82; a lower plate 86, which forms a lower portion thereof; an outer plate 88, which forms an outer portion thereof in the transverse direction of the vehicle; and, an inner plate 90, which forms an inner portion thereof in the transverse direction of the vehicle. The upper plate 84 has a substantially rectangular cross-section, with an opening thereof being oriented downward. The lower plate 86 has a substantially rectangular cross-section, with an opening thereof being oriented upward.

The outer plate 88 includes: a planar front section 88A; and, a rear section 88B, which has a substantially rectangular cross-section, with an opening thereof being oriented inward in the transverse direction of the vehicle. An upper edge portion of the front section 88A of the outer plate 88 is welded to a lower edge portion of an outer wall portion 84A of the upper plate 84 from the outside in the transverse direction of the vehicle. A lower edge portion of the front section 88a of the outer plate 88 is welded to an upper edge portion of an outer wall portion 86A of the lower plate 86 from the outside in the transverse direction of the vehicle. An upper edge portion of the rear section 88B of the outer plate 88 is welded to the upper plate such a way that an outwardly oriented square corner portion 200A of the upper plate 84 in the transverse direction of the vehicle is overlaid with a corner portion 204A of the rear section 88B of the outer plate 88. A lower edge portion of the rear section 88B of the outer plate 88 is welded to the lower plate 86 in such a way than an outwardly oriented corner portion 202A of the lower plate 86 in the transverse direction of the vehicle is overlaid with a corner portion 204B of the rear section 88B of the outer plate 88.

The inner plate 90 includes: a planar front section 90A; and a rear section 90B, which has a substantially rectangular cross-section, with an opening thereof being oriented outward in the transverse direction of the vehicle. An upper edge portion of the front section 90A of the inner plate 90 is welded to a lower edge portion of an inner wall portion 84B of the upper plate 84 from the inside in the transverse direction of the vehicle. A lower edge portion of the front section 90A of the inner plate 90 is welded to an upper edge portion of an inner wall portion 86B of the lower plate 86 from the inside in the transverse direction of the vehicle. An upper edge portion of the rear section 90B of the inner plate 90 is welded to the upper plate 84 in such a way than an inwardly oriented corner portion 200B of the upper plate 84 in the transverse direction of the vehicle is overlaid with a corner portion 206A of the rear section 90B of the inner plate 90. A lower edge portion of the rear section 90B of the inner plate 90 is welded to the lower plate 86 in such a way that an inwardly oriented corner portion 202B of the lower plate 86 in the transverse direction of the vehicle is overlaid with a corner portion 206B of the rear section 90B of the inner plate 90.

Again, the crush box 82 forms an enclosed cross-sectional configuration having a substantially rectangular cross-section, which extends in the longitudinal direction of the vehicle. In addition, FIG. 12B illustrates the front section 82A of the crush box 82, in which each corner portion is formed by one plate member. FIG. 12C illustrates the rear section 82B of the crush box 82, in which each corner portion is formed by two plate members overlaid one over the other.

Consequently, concerning the crush box 82, the rear section 82B provides a higher level of total plastic characteristic, when under load, than the front section 82A in accordance with Kalman's effective width theory (a load is experienced at the corner portions). The again, in the crush box 82 according to the present embodiment, axially compressive deformation is thereby introduced first in the front section 82A and then in the rear section 82B when the load is imparted from the front of the vehicle body. Benefits from the present embodiment, which are similar to those of the first embodiment, are thereby obtained. In addition, the present embodiment uses a fewer number of plate members than the first embodiment, thereby making the complete crush box lighter.

What is claimed is:

1. A front body structure for use in a vehicle comprising:
 a front-side member disposed on a vehicle body;
 a crush box disposed in front of said front-side member, said crush box including first and second sections, said first section adapted to exhibit a plastic characteristic upon compressive deformation, said second member adapted to exhibit a plastic characteristic greater than that of said first section upon compressive deformation thereof, whereby said crush box exhibits a total plastic characteristic in a first and a second stage when under a compressive load; and
 an acceleration sensor mounted on said vehicle body and operatively associated with said crush box so that deformation of said crush box due to the compressive load of said second stage activates said sensor at a predetermined acceleration value.

2. A front body structure according to claim 1, wherein said crush box is formed into an enclosed cross-sectional configuration, said first section being a front section of said crush box and disposed in a forward direction of said vehicle, said second section being a rear section of said crush box and disposed in a rearward direction of said vehicle.

3. A front body structure according to claim 2, wherein said rear section has at least one member which is thicker than at least one member of said front section.

4. A front body structure according to claim 3, wherein each of said front section and said rear section includes four plate members, in which two pairs of opposed plate members are welded together so as to form said enclosed cross-sectional configuration having a substantially rectangular cross-section, which extends in the longitudinal direction of said vehicle.

5. A front body structure according to claim 2, wherein said crush box is formed into said enclosed cross-sectional configuration by a combination of plate members of different thickness.

6. A front body structure according to claim 5, wherein said crush box includes four plate members in which two pairs of opposed plate members are welded together so as to form said enclosed cross-sectional configuration having a substantially rectangular cross-section, which extends in the longitudinal direction of said vehicle, and wherein each of said opposed plate members from one of said two pairs has a substantially rectangular cross-section due to opposite wall portions extending in the vertical direction of said vehicle, each of said wall portions including a front section of a smaller width and a rear section of a larger width, while the other of said two pairs has planar plate members, thinner than said one pair of opposed plate members, each of said planar plate members including a front section of a larger width and a rear section of a smaller width.

7. A front body structure according to claim 2, wherein said front section has a smaller cross-sectional area than a cross-sectional area of said rear section.

8. A front body structure according to claim 7, wherein said crush box includes four plate members in which two pairs of opposed plate members are welded together so as to have a substantially rectangular cross-section, and wherein step portions are formed at opposite locations on said opposed plate members from one of said two pairs, in order that said front section of said crush box from said step portions in the longitudinal direction of said vehicle has a smaller cross-sectional area than said rear section of said crush box from said step portions in the longitudinal direction of said vehicle.

9. A front body structure according to claim 8, further comprising: a bulkhead, which is fixedly welded to said step portions so as to reinforce said step portions.

10. A front body structure according to claim 7, wherein said crush box includes: a first cylindrically enclosed cross-sectional configuration, which occupies said front section of said crush box; a second cylindrically enclosed cross-sectional configuration, which occupies said rear section of said crush box so as to form substantially the same cross-sectional shape as that of said first cylindrically enclosed cross-sectional configuration; and, a wall surface portion, which is interposed between said first and said second cylindrically enclosed cross-sectional configurations so as to be connected therebetween by welding, thereby allowing said first cylindrically enclosed cross-sectional configuration to be driven into said second cylindrically enclosed cross-sectional configuration upon imparting a lighter load than in producing axially compressive deformation in said first cylindrically enclosed cross-sectional configuration as well as said second cylindrically enclosed cross-sectional configuration.

11. A front body structure according to claim 2, wherein said crush box is formed into said enclosed cross-sectional configuration by a combination of plate members of the same thickness.

12. A front body structure according to claim 11, wherein said crush box includes four plate members in which two pairs of opposed plate members are welded together so as to form said enclosed cross-sectional configuration having a substantially rectangular cross-section, which extends in the longitudinal direction of said vehicle, and wherein each of said opposed plate members from one of said two pairs has a substantially rectangular cross-section because of opposite wall portions extending in the vertical direction of said vehicle, each of said wall portions including a front section of a smaller width and a rear section of a larger width, while the other of said two pairs has planar plate members in the form of a square.

13. A front body structure according to claim 11, wherein said crush box includes four plate members in which two pairs of opposed plate members are welded so as to form said enclosed cross-sectional configuration having a substantially rectangular cross-section, which extends in the longitudinal direction of said vehicle, and wherein each of said opposed plate members from one of said two pairs has a substantially rectangular cross-section due to opposite wall portions extending in the vertical direction of said vehicle, each of said wall portions being made up of a front section of a smaller width and a rear section of a larger width such that said rear sections of said opposite wall portions of one plate member from said one pair of opposed plate members can be overlaid, from the outside in a thickness direction, with those of the other plate member from said one pair of opposed plate members, while the other of said two pairs has planar plate members in the form of a square.

14. A front body structure according to claim 11, wherein said crush box includes four plate members in which twp pairs of opposed plate members are welded together so as to form said enclosed cross-sectional configuration having a substantially rectangular cross-section, which extends in the longitudinal direction of said vehicle, and wherein each of said opposed plate members from one of said two pairs has a substantially rectangular cross-section, while each of said opposed plate members from the other of said two pairs includes a planar front section and a rear section having a substantially rectangular cross-section, whereby corner portions in said front section of said crush box are each formed by one plate member from said one pair of opposed plate members, while those in said rear section of said crush box are each formed by two plate members overlaid one above another in the thickness direction, said two plate members consisting of each one of said one pair and said other pair of opposed plate members.

15. A front body structure according to claim 11, wherein said front section and said rear section are made of different materials in order that said front section acquires less strength in relation to a load imparted thereon than said rear section.

16. A front body structure for use in a vehicle which is provided with an acceleration sensor, comprising:
   a front-side member, which is disposed on a vehicle body; and
   a crush box, which is provided in front of said front-side member so as to exhibit a total plastic characteristic, when under load, in two stages,
   said crush box being formed into an enclosed cross-sectional configuration, in which a front section of said crush box in a forward direction of said vehicle provides a lower level of total plastic characteristic, when under load, than a rear section thereof in a rearward direction of said vehicle, thereby allowing said crush box to exhibit said total plastic characteristic, when under load, in two stages, said front section having a cross-sectional area that is smaller than a cross-sectional area of said rear section,
   said crush box including four plate members in which two pairs of opposed plate members are welded together so as to have a substantially rectangular cross-section, and wherein step portions are formed at opposite locations on said opposed plate members from one of said two pairs, in order that said front section of said crush box from said step portions in the longitudinal direction of said vehicle has a smaller cross-sectional area than said rear section of said crush box from said step portions in the longitudinal direction of said vehicle.

17. A front body structure according to claim 16, further comprising: a bulkhead, which is fixedly welded to said step portions so as to reinforce said step portions.

* * * * *